United States Patent
Wang et al.

(10) Patent No.: US 7,257,425 B2
(45) Date of Patent: Aug. 14, 2007

(54) SYSTEM AND METHOD FOR PROVIDING A SMART ANTENNA

(75) Inventors: James June-Ming Wang, San Marino, CA (US); Jack Winters, Middletown, NJ (US); Richard McConnell, Rancho Cucamonga, CA (US)

(73) Assignee: Motia, Pasadena, CA (US)

( * ) Notice: Subject to any disclaimer, the term of this patent is extended or adjusted under 35 U.S.C. 154(b) by 2 days.

(21) Appl. No.: 11/001,911

(22) Filed: Dec. 2, 2004

(65) Prior Publication Data

US 2005/0130606 A1 Jun. 16, 2005

Related U.S. Application Data

(60) Provisional application No. 60/526,340, filed on Dec. 2, 2003.

(51) Int. Cl.
*H04M 1/00* (2006.01)
(52) U.S. Cl. ............................. 455/562.1; 455/561
(58) Field of Classification Search ............ 455/562.1, 455/561, 63.4, 73; 342/383, 372
See application file for complete search history.

(56) References Cited

U.S. PATENT DOCUMENTS

| | | | | |
|---|---|---|---|---|
| 5,610,617 A | * | 3/1997 | Gans et al. | 342/373 |
| 5,621,752 A | * | 4/1997 | Antonio et al. | 375/144 |
| 6,104,935 A | * | 8/2000 | Smith et al. | 455/562.1 |
| 6,115,409 A | * | 9/2000 | Upadhyay et al. | 375/144 |
| 6,236,839 B1 | * | 5/2001 | Gu et al. | 455/67.14 |
| 6,252,548 B1 | * | 6/2001 | Jeon | 342/383 |
| 6,300,918 B1 | * | 10/2001 | Riddle et al. | 343/895 |
| 6,574,482 B1 | * | 6/2003 | Radomsky et al. | 455/517 |
| 6,975,178 B1 | * | 12/2005 | Kessler et al. | 333/105 |
| 2001/0012278 A1 | * | 8/2001 | Ma | 370/329 |
| 2002/0089447 A1 | * | 7/2002 | Li | 342/368 |
| 2004/0022219 A1 | * | 2/2004 | Mangold et al. | 370/336 |

\* cited by examiner

*Primary Examiner*—Duc M. Nguyen
*Assistant Examiner*—Chuck Huynh
(74) *Attorney, Agent, or Firm*—Patentry; Peter G. H. Hwang (57) ABSTRACT

A smart external antenna module is proposed for wireless systems. The module allows the advantages of smart antennas to be easily added to existing wireless systems without any modification to the transceiver. Specifically, the smart antenna module weights and combines the signals received by multiple antennas to improve the received signal quality, and then when it detects that there is a signal to be transmitted by the transceiver, it turns off the receiver, turns on the transmitter and uses the receive weights to transmit the signal out of the multiple antennas to improve signal reception at the desired user. Such a module can be added to the external antenna port of an existing transceiver with no change to that transceiver.

11 Claims, 11 Drawing Sheets

SYSTEM AND METHOD FOR PROVIDING A SMART ANTENNA

CROSS REFERENCE TO RELATED APPLICATION

This application claims the benefit of U.S. Provisional Patent Application No. 60/526,340 filed Dec. 2, 2003 the entirety of which is hereby incorporated by reference into this application.

BACKGROUND OF THE INVENTION

1. Field of the Invention

The present invention is directed to a system and method for providing a smart antenna system in which an antenna array can attach to an external port of a transceiver without any modification of the transceiver.

2. Description of the Related Art

In the past, companies had turned to wireless local area networks (WLANs) only to support low data intensive applications such as inventory management in warehouses and retail price marking in stores. For these applications, even though wireless network interface cards (NIC) are very costly, the improved efficiency derived from going wireless was worth the investment. The high price and low data rates, however, limited the usefulness and penetration of WLANs for general applications.

With the introduction of inexpensive, high-performance 11 M bit/sec products based on the IEEE 802.11b (Wi-Fi) standard, acceptance of WLANs for home, Small Office Home Office (SOHO) and enterprise applications has been increasing significantly. Home-based LANs have accounted for most of the initial market growth. The use of broadband connections and multiple PCs in the home has spurred home users to employ easy to install WLANs to share the broadband connection and network their computers. Wi-Fi adoption is quickly reaching mainstream levels as a communications technology across the enterprise, service providers and home.

Growth in enterprise WLAN deployments has also begun to accelerate. It has been found that wireless networks contribute to a better working environment and higher productivity for employees while bringing down the costs of networking.

Recently, WLANs have begun to get support from traditional wireless and wireline service providers. Public telecom carriers view Wi-Fi 802.11 connectivity as a new type of "data subscription" service that eventually will give users access to different types of wireless networks, either local or wide area, depending on what is available in a given location. Companies such Sprint, Verizon Wireless and SBC Communications have unveiled their Wi-Fi rollout plans. SBC also announced it was rolling out Wi-Fi in public hot spots to support its bundled DSL broadband offering. Traditional wireless carriers are adding Wi-Fi to their product offerings.

WLAN technology is also becoming standard equipment in portable computers. Notebook computer manufacturers such as IBM, Dell, HP/Compaq and Toshiba are building Wi-Fi into their systems, as notebook computers become the systems of choice for corporate users.

This explosion in growth comes despite the fact that today's Wi-Fi semiconductor chips have many shortcomings. The key limitation is that end-users do not experience the same quality of service. End-users can be too far away from an access point, behind a wall, in a "dead spot", or working off a laptop. In addition, WLANs fall short of expected range when actually deployed. Even though a vendor's specifications may state that the wireless has a range of 300 feet, for example, obstacles such as walls, desks and filing cabinets can significantly decrease the range and coverage uniformity in some directions.

Smart antennas can significantly improve the performance of wireless systems by adaptively weighting and combining the signals received by multiple antennas. These antennas can increase receive signal gain, mitigate multipath fading, suppress interference, and increase throughput. Using smart antennas on transmission can also improve performance at the desired user as well. Conventional implementation of smart antennas typically required major modification to the RF, baseband, and MAC portions of the transceiver, which is a time consuming and costly process. Many wireless systems have an external antenna port for the transceiver. However, this port is generally used to attach a fixed, higher gain antenna.

The three physical layer standards for 802.11 are 802.11b, 802.11g, and 802.11a. 802.11b uses a single carrier with data rates of 1, 2, 5.5, and 11 Mbps, and operates in the 2.4 GHz unlicensed band. At the beginning of each data packet, there is a preamble, the first 20 microseconds of which are available for antenna selection purposes (as used by many 802.11 receivers). 802.11g and 802.11a use OFDM modulation, with data rates of 6, 9, 12, 18, 24, 36, 48, and 54 Mbps, operating in the 2.4 and 5.5 GHz unlicensed bands, respectively. At the beginning of each data packet, the preamble only contains about 2 microseconds for antenna selection purposes. All three techniques use time-division-duplexing (TDD), that is, the same frequency is used for transmission as for reception.

In consideration of the incorporation of smart antennas into 802.11 systems, one method is to completely redesign the 802.11 transceiver with smart antenna processing as an integral part. This method allows for the optimal performance improvement with M antennas, as well as for design optimization. However, it has the following significant disadvantages. First, it requires a substantial redesign effort by every chip manufacturer without the gains being completely verified until the chip is completed. Second, it results in an across the board increase in the cost of the 802.11 chipset for smart antenna gains that may not be appreciated by all users. Given that the current market is very price sensitive, any undervalued increase in cost will definitely result in lost sales by consumers who may not understand or know if they need the gains of smart antennas, and purchase on price alone. One way for chip vendors to avoid this risk is to create two versions of their chips: one with and one without smart antenna functionality. However, if the chip manufacturers make two versions of their chips without at least a doubling of volume, they risk the price advantage that comes through volume. Finally, consumers that purchased WLANs without smart antennas, and then found that they needed them, would have to completely replace their access points, client cards or both.

It is desirable to provide a smart external antenna module that provides an antenna array that can attach to an external port of a transceiver without any modification of the transceiver to provide improved performance with low manufacturing costs.

SUMMARY OF THE INVENTION

The present invention relates to a method and system of providing a smart antenna using a smart antenna appliqué.

The smart antenna appliqué comprises a smart external antenna module (SEAM) which attaches to the external antenna port of a transceiver without any modification of the transceiver. The only input to the smart antenna module is the signal to be transmitted from the transceiver and the only output is the received signal after smart antenna processing, which is sent on the same cable connection as the transmitted signal.

The SEAM can be attached to an AP (Access point) to enhance both the transmit and receive range and coverage. Depending on the configuration the SEAM does this by a combination of beamforming and power amplification. SEAM uses a smart antenna integrated circuit to perform beamforming. For example, SEAM can employ the JSA100 Smart Antenna Integrated Circuit manufactured by Motia, Inc., Pasadena, Calif.

In a default operation, SEAM is in a receive mode. While in a receive mode the unit is performing beamforming operations for any signals it receives. When the AP transmits the SEAM senses this and switches to a transmit mode. In the transmit mode the unit can use power amplification over either a single antenna or all antennas driven with fixed (possibly equal) weights, or the unit can use all its antennas to transmit to the desired user with the weights last calculated for reception from that same user. SEAM can be configured to perform transmit beam forming only without doing receive beam forming. In this (transmit beam forming only) configuration, SEAM uses all its antennas to transmit to the desired user with the weights last calculated for reception from that same user.

In the receive mode, the weights to be used with input signals from a plurality of antennas can be calculated in a blind manner to improve performance and the weighted signals combined to produce an output signal. It has been found that because of the very short acquisition time for 802.11a/g, the latency of digital signal processing for weight calculation is a severe problem which is reduced by the use of analog processing rather than digital processing. In an embodiment of the present invention, the weights are calculated with analog processing, as digital processing adds significantly more latency.

In an embodiment of the present invention, the weights are calculated using maximal ratio combining, which maximizes the receive output signal-to-noise ratio. Shortly after receive packet detection, the weights can be frozen and held until the end of the packet is detected for better performance. When the transceiver sends a signal to be transmitted, the smart antenna module detects this signal, turns off the receiver and turns on the transmitter, including power amplifiers. The transmitted signal is then split, weighted by the most recent receive signal weights, and then transmitted from the antennas. In one embodiment, the weights are the equal gain combining weights, which are just the phase of the maximal ratio combining weights, to maximize transmit signal power. In this embodiment, the power amplifiers can all operating at their maximum output power. Alternatively, if the desired user is unknown for a given packet to be transmitted (which may be the case at an access point with multiple users), the transmitted signal can use fixed weights that give an approximately omnidirectional pattern.

The present invention relates to an implementation derived for 802.11, and the performance of this implementation is presented. The present invention permits seamless integration of smart antenna technology with existing WLAN chipset architecture. Since the 802.11 system uses time division duplexing (the same frequency is used for transmit and receive), smart antennas of the present invention can be used for both transmit and receive, providing a gain on both uplink and downlink, using smart antennas on either the client or access point alone.

Results show a 13 dB gain with a four element smart antenna of the present invention over a single antenna system with the smart antenna on one side only, and an 18 dB gain with the smart antenna on both the client and access point. The present invention provides a "plug-and-play" adaptive array technology which can provide greater range, average data rate increases per user, and better overall coverage.

The major advantage of this system is improved performance over the standard AP without the need to use processing resources from the AP. This allows for the flexible provisioning of enhanced performance to those users who require it.

The appliqué of the present invention has the following advantages: fully 802.11 compliant; works with any transceiver chip set; virtually "plug and play;" applicable to access points and client devices; extends range up to about 4 times; increases throughput by 50% and higher; eliminates Dead Spots; reduces Power Drain up to about 90%; and has low manufacturing and operating costs. Utilizing smart antenna appliqués of the present invention to improve 802.11 systems is a cost-effective way to gain the clear benefits to WLAN performance without requiring the complete re-engineering of wireless equipment.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
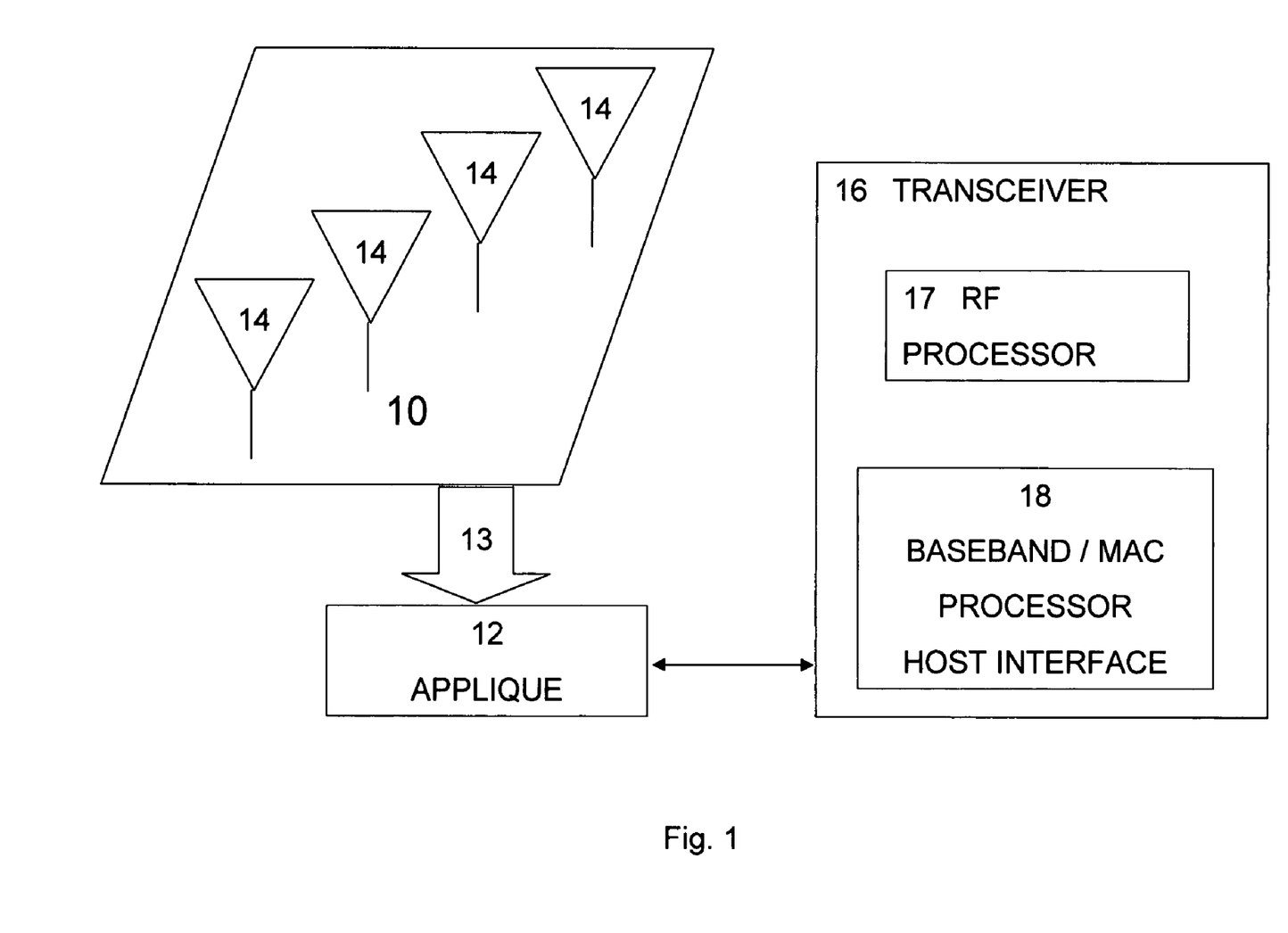
FIG. 1 is a block diagram of a system for providing a smart antenna.

FIG. 1 is a block diagram of a system for providing a smart antenna 10 in accordance with the teaching of the present invention. Appliqué 12 communicates with a plurality of antennas 14a-d and transceiver 16 using radio frequency (RF) communication techniques. Appliqué 12 combines signals 13a-13d from respective antennas 14a-14d and combines them to generate input signal 17 to transceiver 16. In this embodiment, four antennas are used in system 10 and appliqué 12 combines the four signals from the four antennas to generate the input signal to transceiver 16. It will be appreciated in alternative embodiments, various numbers of antennas can be used and the signals from the antennas can be weighted and combined to form an input signal to the transceiver.

In one embodiment, appliqué 12 provides an adaptive array to weight and combine the received signals for forming input signal 17 to transceiver 16. The use of an adaptive array provides an array gain, such as 6 dB with four antennas, in all environments, along with a diversity gain in multipath environments.

For the adaptive array to provide the full diversity gain against multipath fading, the fading at each antenna element should be nearly independent. However, the correlation of the fading among the antennas can be as high as 0.7 before the degradation exceeds 1 dB. The correlation can be kept below this level through the use of the following diversity types. The first diversity type is spatial diversity or the spatial separation of the antennas. In a severe multipath environment, such as indoors or around a handset, only about a quarter of a wavelength spacing is needed to obtain low fading correlation. The second diversity type is polarization diversity. The use of dual polarization, horizontal and vertical, allows one physical antenna to be used for two input signals (using different feeds for each polarization). A third diversity type is pattern diversity, the use of antenna elements with different patterns. The combination of the above types of diversity permits the use of a large number of antennas even in a small form factor, such as a PCMCIA card or handset, with near ideal performance.

There are several combining techniques for the adaptive array. The simplest is selection diversity, whereby the antenna with the highest received signal power is selected for the output signal. This technique does not use all the received signal power and therefore is limited in its dB gain improvement over a single antenna. Another technique for range increase (i.e., in a noise limited environment) is maximal ratio combining (MRC), whereby each signal is weighted and combined to maximize the output signal-to-noise ratio (SNR). The beamforming weights are then the complex conjugate of the channel transfer characteristic, i.e., the received signals are co-phased and their gain adjusted based on their received signal strength. This technique provides a gain of M along with a diversity gain of M in a Rayleigh fading environment. The combiner weights can be generated by correlating the output signal with the received signal on each antenna. Such a method is referred to as a blind technique, as the adaptive array will maximize the SNR of any received signal and demodulation of the received signal is not required.

A modification of MRC is equal gain combining, whereby the signals are co-phased, but the gain is the same for each antenna element. This technique provides an improvement that is typically one dB lower than that of MRC and does not use gain adjustments on each antenna. In an environment where interference is the greatest concern, an improved technique is minimum mean square error (MMSE) combining, whereby the received signals are weighted and combined to maximize the output signal-to-interference-plus-noise ratio. This technique uses a method to distinguish the desired signal from interference. In general, this requires demodulation of the received signal (although blind techniques, such as the Constant Modulus Algorithm are possible) and thus weight generation is performed by a non-blind technique.

In a multipath environment, when the difference in the propagation delays of the various paths between the transmitter and receiver (the delay spread) becomes comparable to the symbol period, frequency selective fading results in intersymbol interference which degrades performance. To overcome this impairment, typically temporal equalization at the receiver or OFDM is used. Both of these techniques are conventionally implemented in 802.11. In this case, spatial processing (i.e., the adaptive array described above) followed by temporal equalization or OFDM demodulation is not optimum, and joint spatial-temporal processing is needed for optimal performance, although close to optimum performance with the former technique can often be achieved if the delay spread is small.

Transceiver 16 can include RF processor 17 and baseband/MAC processor 18. RF processor 17 typically downconverts received RF signals for baseband processing and upconverts baseband signals for transmission. Baseband/MAC processor 18 performs processing of baseband signals to receive information from a received signal and to connect information in preparation for transmission. Baseband/MAC processor 18 can also provide a host interface.

Figure 2:
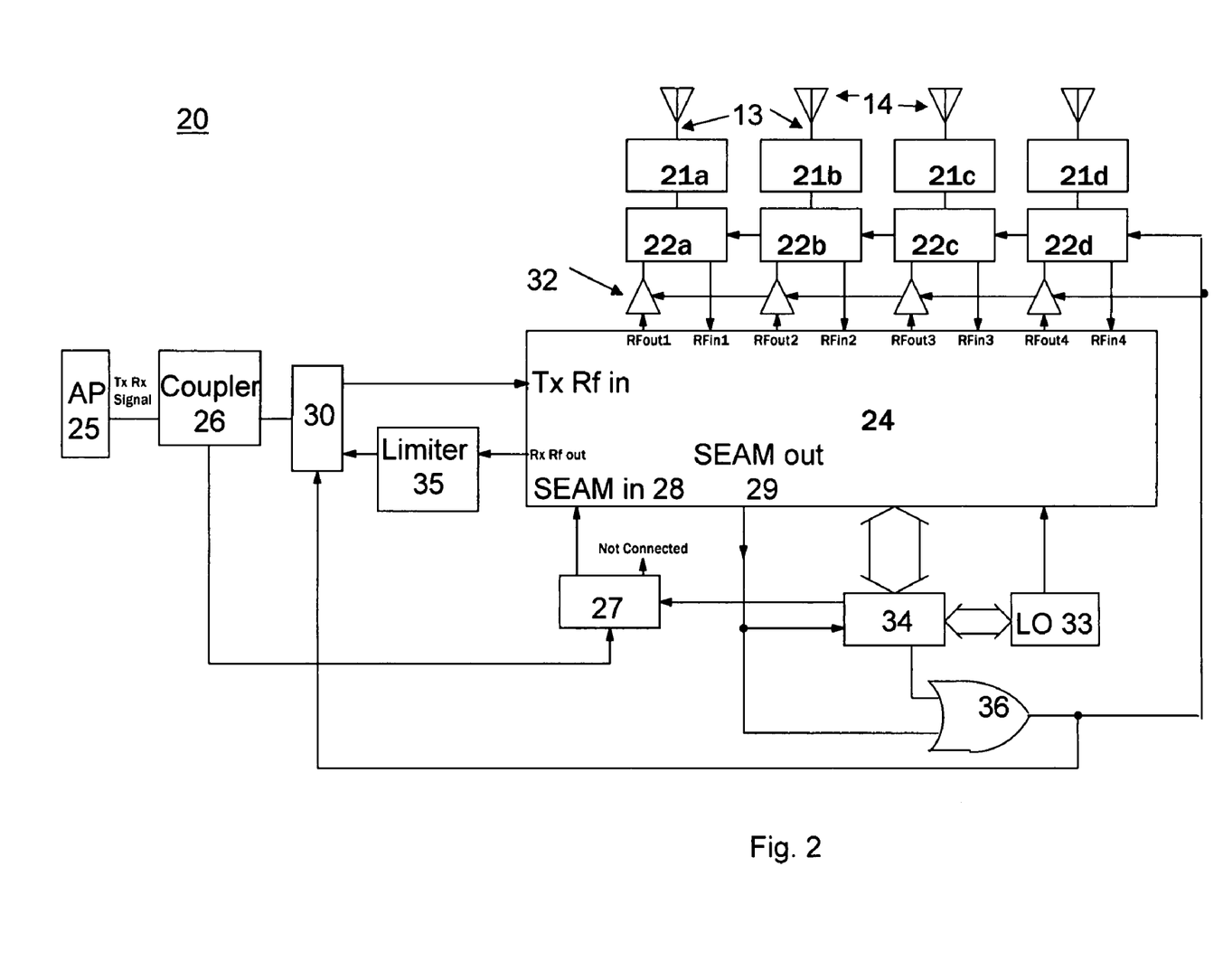
FIG. 2 is an embodiment of a smart external antenna module.

FIG. 2 is a schematic diagram of an implementation of appliqué 12 as smart external antenna module (SEAM) 20. Signals 13a-13d received by antennas 14a-14d are passed through filters 21a-21d and antenna transmit/receive (TR) switches 22a-22d. Signals RFin1, RFin2, RFin3, RFin4 from transmit/receive (TR) switches 22a-22d are weighted and combined using the smart antenna integrated circuit 24. For example, integrated circuit 24 can be a JSA100 circuit manufactured by Motia, Inc., Pasadena, Calif. In one embodiment, integrated circuit 24 performs beamforming using an implementable version of the MRC algorithm for providing weights, which as a blind technique can work for 802.11b, 802.11g, and 802.11a, as long as the weights can be calculated in this algorithm within 2 microseconds after the signal is received as this is the time allotted for 802.11a/g.

In typical operation SEAM 20 is receiving signals, performing beamforming with integrated circuit 24, and sending the signals to a desired location, such as an access point. In preferred embodiments, continuous beamforming over each packet can be done in 802.11b, but in 802.11a/g the module would freeze the antenna weights after 2 microseconds for the duration of each packet so that the weight fluctuations do not affect the performance of the 802.11a/g transceiver.

When access point (AP) 25 transmits, coupler 26 sends a small signal through transmit/receive switch (TR) 27 to SEAM IN pin 28, integrated circuit 24 detects the signal and sets SEAM OUT pin 29 to high. This switches input TR switch 30, antenna TR switches 22a-22d, and turns on the power amplifiers (PA) 32a-32d. When access point (AP) 25 stops transmitting the SEAM OUT pin 29 goes to low, and SEAM 20 returns to a receive mode.

Since there may be no control signal connections between SEAM 20 and access point (AP) 25, when access point (AP) 25 transmits on one frequency channel, SEAM 20 has to independently determine that channel. SEAM 20 can use a mode referred to as pass-through mode for channel determination. In pass-through mode, all the channel weights are set to be the same and SEAM 20 passes the signals to and from access point (AP) 25 with no beamforming. In the meantime, signal 27 from access point (AP) 25 is routed through the SEAM 20 receiver input. When access point (AP) 25 transmits, SEAM 20 sets LO 33 to a channel, and SEAM 20 checks the received power in that specific channel.

After a period of time, SEAM 20 has checked all channels. SEAM 20 selects the channel with the highest power. In this way, SEAM 20 guarantees it has not incorrectly selected a channel due to variations in the background levels. After finding the correct frequency channel SEAM 20 continually checks that SEAM 20 is still on the same channel as access point (AP) 25 to determine if a change to the AP frequency channel has occurred.

SEAM 20 can be implemented as a standalone module and attached to access point (AP) 25 through a single coaxial cable. No other control signal connections are required between SEAM 20 and access point (AP) 25. No software or hardware configuration changes are required in access point (AP) 25 during installation. Such arrangement allows SEAM 20 to be used as a standalone accessory. An AC adaptor (not shown) can supply DC power to SEAM 20.

In an initial operation, SEAM 20 determines which frequency channel access point (AP) 25 is using, i.e., transmitting. SEAM 20 operates in a pass-through mode, where all receive channels are given equal weighting, and receive (RX) and transmit (TX) signals 27 are simply passed along. Microprocessor 34 sets receive LO 33 to channel 1 and waits for access point (AP) 25 to transmit. When access point (AP) 25 transmits, integrated circuit 24 detects the transmission through a power detector associated with SEAM IN pin 28, and sets a SEAM OUT signal to high. Integrated circuit 24 is switched to a transmit mode. In this instance, the receive mode is also active. Limiter 35 is used to stop high energy from access point (AP) 25 from damaging the RF output of integrated circuit 24 before input TR switch 30 activates.

The SEAM OUT signal goes to microprocessor 34. When the SEAM OUT signal goes high, microprocessor 34 sends a high to OR gate 36, to keep the transmit circuitry active. Microprocessor 34 commands Rx circuitry of integrated circuit 24. There is enough transmit signal coming through power amplifiers (PA) 32a-32d and TR switches 22a-22d such that the receiver can detect a signal.

A detection process involves monitoring the power of the received signals filtered by receiver channel filters 21a-21d. Microprocessor 34 measures the power level and the power level is recorded in memory. Microprocessor 34 then switches SEAM 20 to a different channel and waits for the next transmit packet. Once microprocessor 34 has information on all the channels it selects the channel with the highest power level, and enables receive beamforming in integrated circuit 24.

In a normal operation, SEAM 20 is in the receive mode. When access point (AP) 25 starts to transmit a signal, coupler 26 couples the power of the transmit signal to the SEAM_IN pin 28 of integrated circuit 24. A power detector of integrated circuit 24 detects the transmit power and automatically switches integrated circuit 24 to the transmit mode. In the meantime, the SEAM_OUT pin 29 switches the antenna TR switches 22a-22d, input TR switch 30, and power amplifiers 32 to allow transmission.

As soon as access point (AP) 25 stops transmitting, the power level at SEAM_IN pin 28 drops and integrated circuit 24 switches back to the receive mode.

This embodiment of SEAM module 20 is implemented with four antennas for both receive and transmit, and no interaction with the AP microprocessor. This embodiment provides high functionality with easy integration into an existing system. It can support Rx beamforming for any received packet, but for Tx beamforming only the last Rx weights are used for the transmit, i.e., the SEAM always transmits back to the last user that a packet was received from. This may be satisfactory for a client that only receives signals from one AP, but would not be effective for an AP with multiple clients. To avoid this problem, alternatively, transmission can be performed using an omnidirectional beampattern, i.e., without transmit beamforming.

Figure 3:
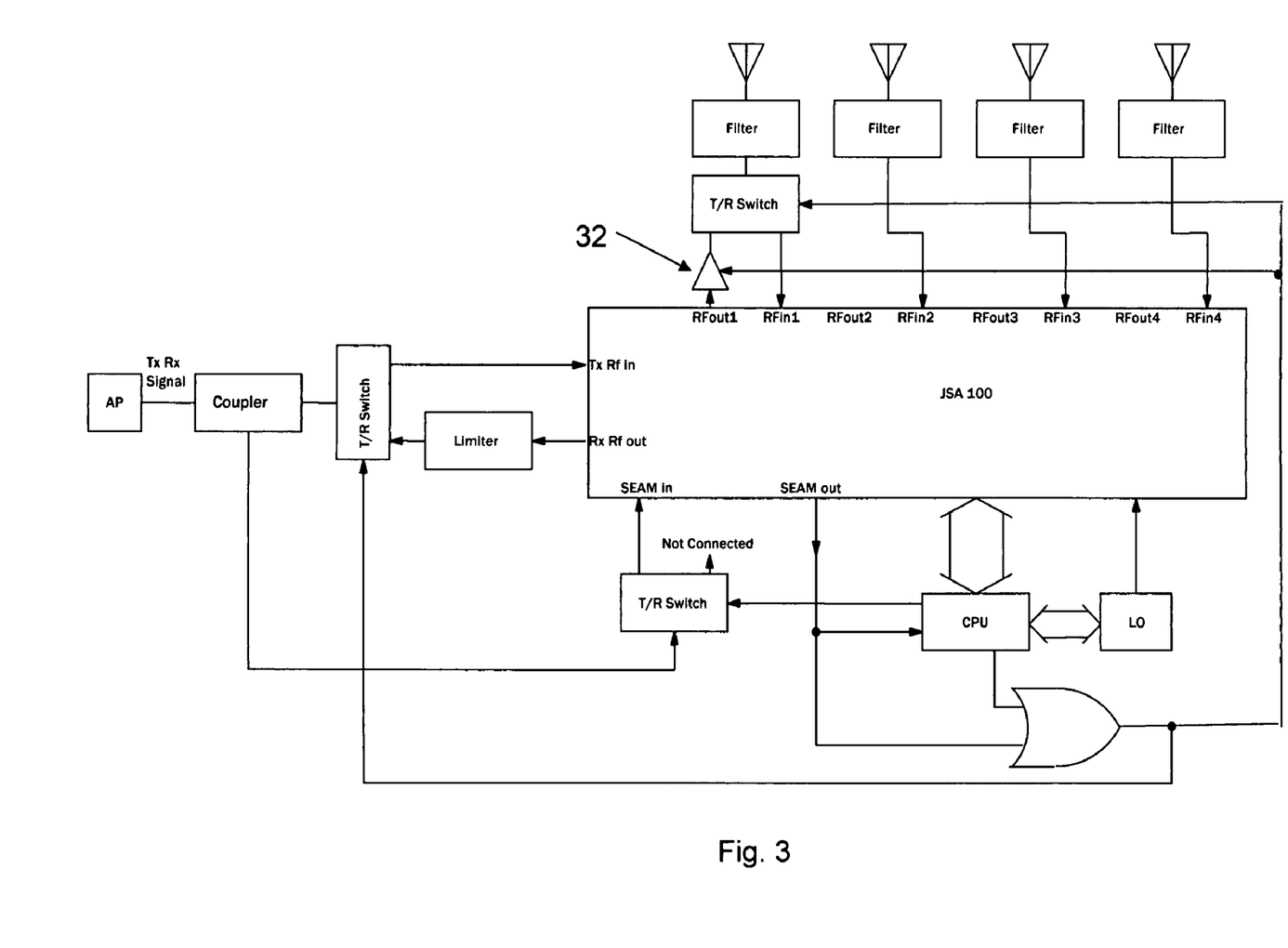
FIG. 3 is an alternate embodiment of a smart external antenna module.

FIG. 3 is a schematic diagram of an alternate embodiment of SEAM 20 without transmit beamforming. In this embodiment, a single power amplifier 32 is used instead of four power amplifiers 32a-32d shown in the embodiment illustrated in FIG. 2. It is expected that the output power of an embodiment using a single power amplifier 32 is 6 dB higher than the output power of an embodiment using four power amplifiers 32a-32d.

The normal operation of SEAM 20 in this embodiment is the same as the embodiment of FIG. 2 except that only one antenna is used for transmission.

Figure 4:
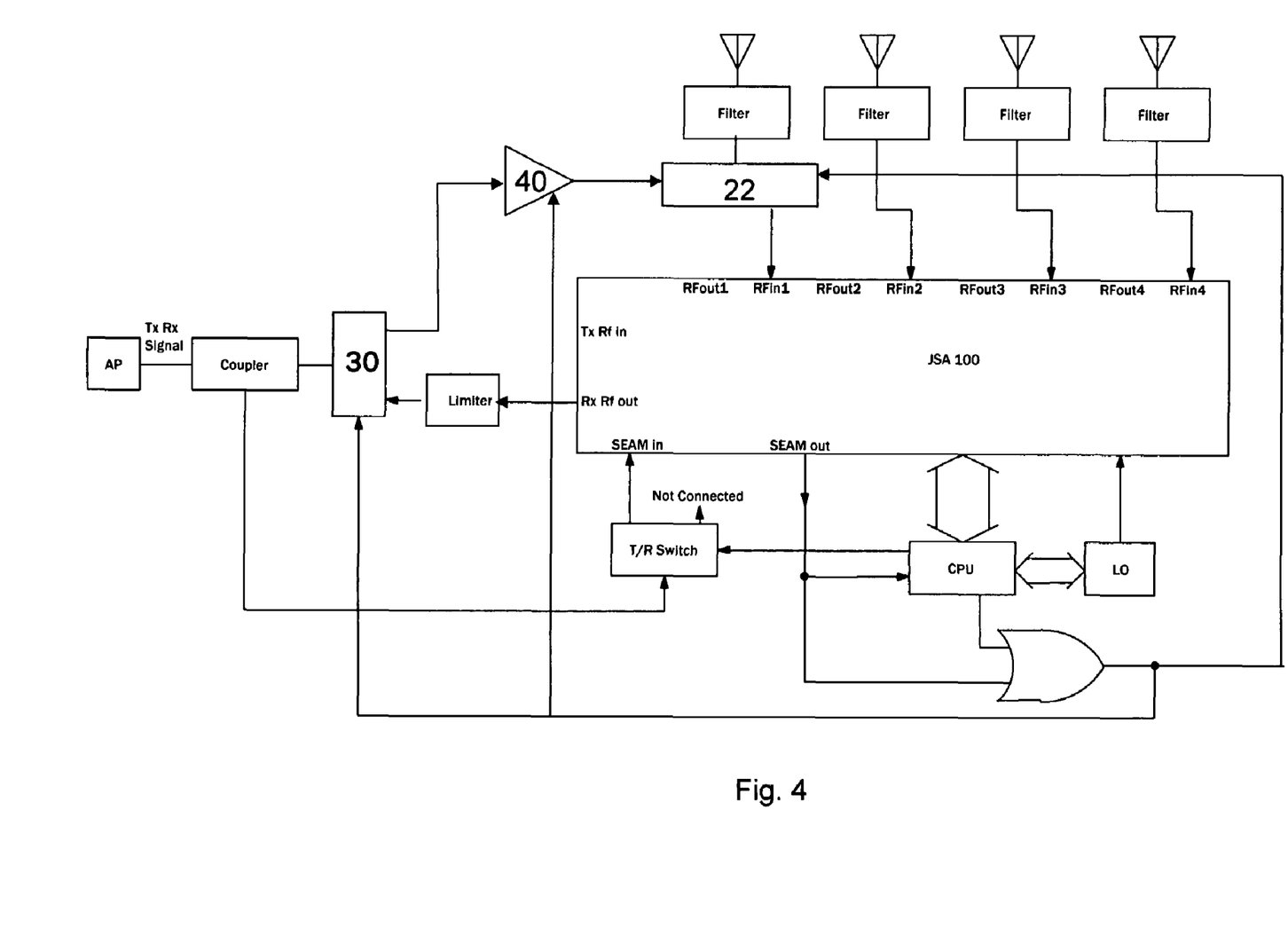
FIG. 4 is an alternate embodiment of a smart external antenna module.

FIG. 4 is a schematic diagram of an alternate embodiment of SEAM 20. This embodiment does not use internal PAs. Accordingly, power used by these circuits can be saved. This embodiment connects power amplifier 40 between antenna TR switch 22 and input TR switch 30.

Figure 5:
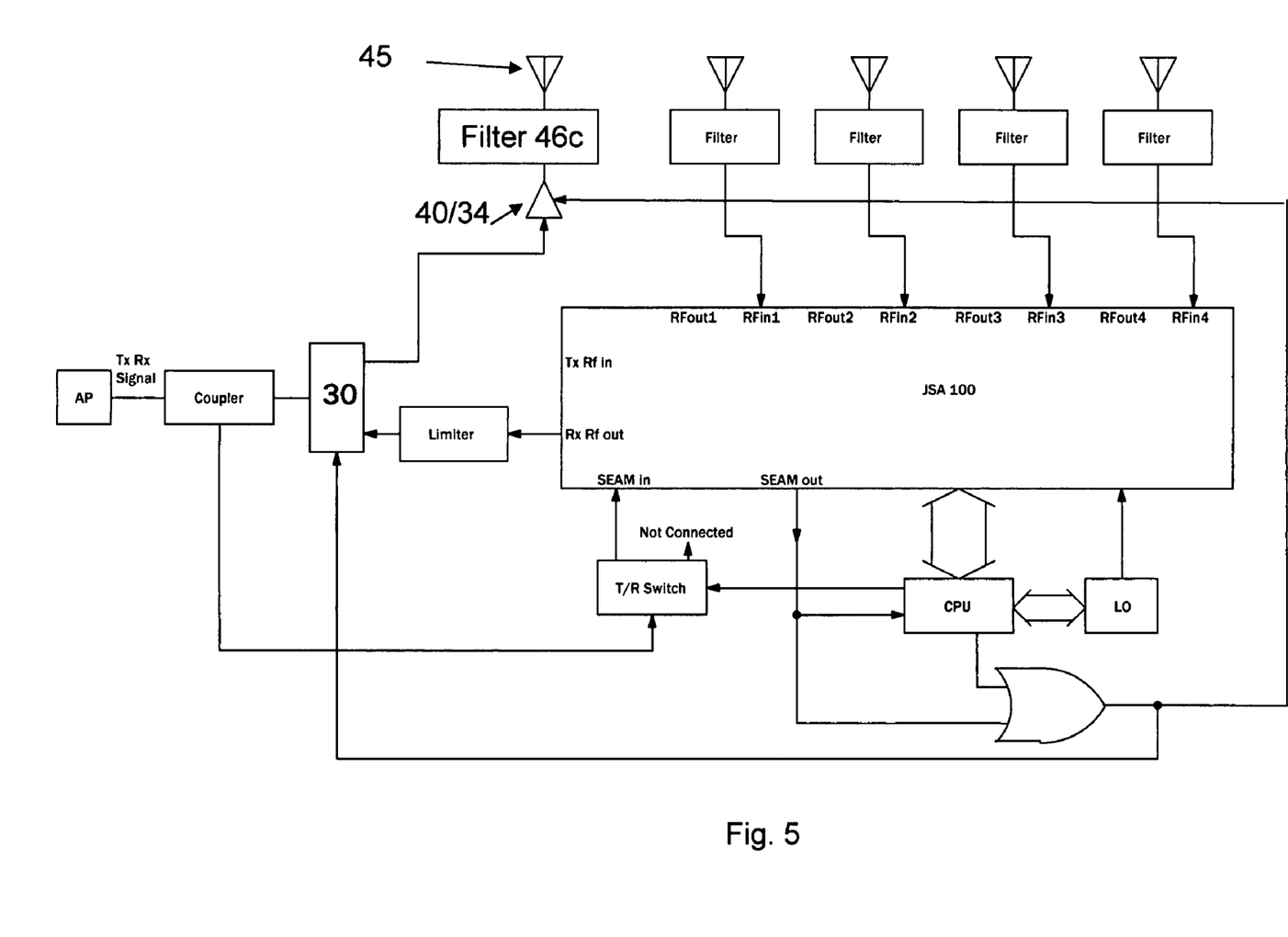
FIG. 5 is an alternate embodiment of a smart external antenna module.

FIG. 5 is a schematic diagram of an alternate embodiment of SEAM 20. This embodiment does not use antenna TR switch 22. This embodiment uses transmit antenna 45 and filter 46c. Power amplifier 40 is connected between input TR switch 30 and transmit antenna 45.

This SEAM module provides lowest cost implementation with low manufacturing costs. It uses one PA 34 to drive an additional antenna for transmission, rather than one of Rx antennas 14 as in FIG. 4. This embodiment also has no interaction with the AP's microprocessor. It has receive beamforming, but does not provide transmit beamforming.

Figure 6:
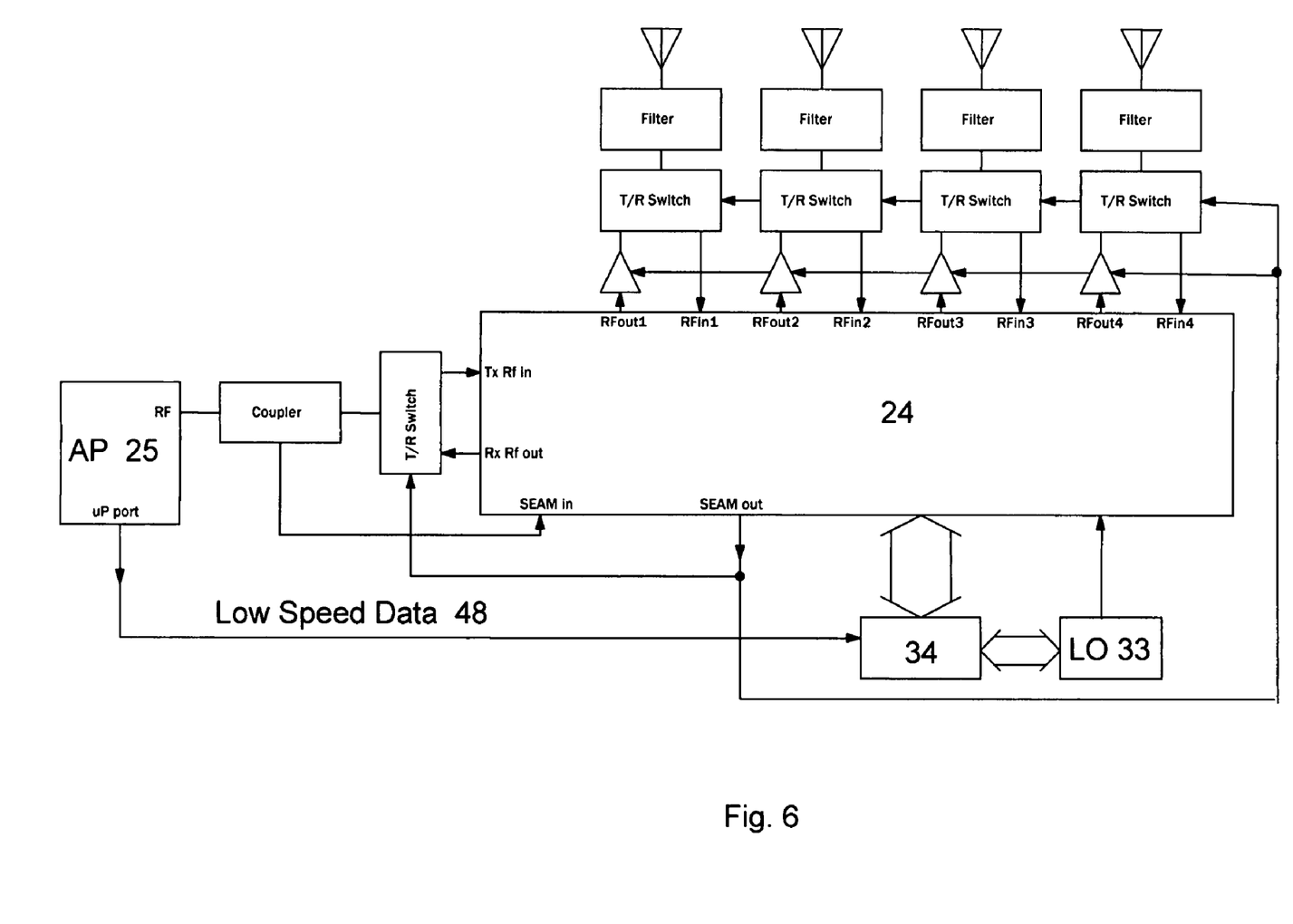
FIG. 6 is an alternate embodiment of a smart external antenna module.

FIG. 6 is a schematic diagram of an alternate embodiment of SEAM 20. In an initial operation, the channel frequency is passed from access point (AP) 25 to SEAM 20 via a signaling data channel 48. A signaling data channel provides digital control data from AP to SEAM necessary to set the antenna weight. Since this data signal is at a different frequency as the RF signal, it can be sent through the same coax cable as the transmit and receive RF signal. Microprocessor 34 programs LO 33 to the desired channel. This embodiment does not need to search for the AP frequency channel.

In a normal operation, integrated circuit 24 is normally in the receive mode. When a packet arrives at access point (AP) 25, integrated circuit 24 performs a beamforming operation and provides an enhanced signal to access point (AP) 25. When access point (AP) 25 detects the signal, it passes the packet ID to microprocessor 34. Microprocessor 34 samples the antenna weights with an on-chip analog digital conversion (ADC) and stores the weights in a table associated with the receive ID (not shown).

When access point (AP) 25 wants to transmit to a specific destination, access point (AP) 25 passes the destination ID to microprocessor 34 and instructs microprocessor 34 to load the weight associated with the ID into integrated circuit 24. Access point (AP) 25 then transmits the packet, and integrated circuit 24 detects the transmit power through SEAM_IN pin 28 and switches to the transmit mode. Once access point (AP) 25 terminates transmission, integrated circuit 24 returns to the receive mode.

This embodiment uses a signaling data link with the AP's microprocessor to get information about the next transmit signal. SEAM 20 has full receive and transmit beamforming. In an alternate embodiment, variants of this embodiment and the embodiments shown in FIGS. 3-5 could be used to provide reduced costs.

SEAM 20 processes a received signal and passes it to access point (AP) 25. Access point (AP) 25 further processes the signal to extract data. In order not to interfere with operation of access point (AP) 25, SEAM 20 can implement a weight freeze. In a weight freeze embodiment, SEAM 20 computes the antenna weights on a packet by packet basis in the first two microseconds of the preamble of each packet using an adaptive algorithm. After the first two microseconds, if SEAM 20 were to continue to adapt the antenna weight for the entire duration of the packet, access point (AP) 25 receiver operation might be affected. Accordingly, it is desirable to freeze the antenna weight right after two microseconds into the preamble to avoid interfering with operation of the access point (AP) 25 receiver.

Figure 7:
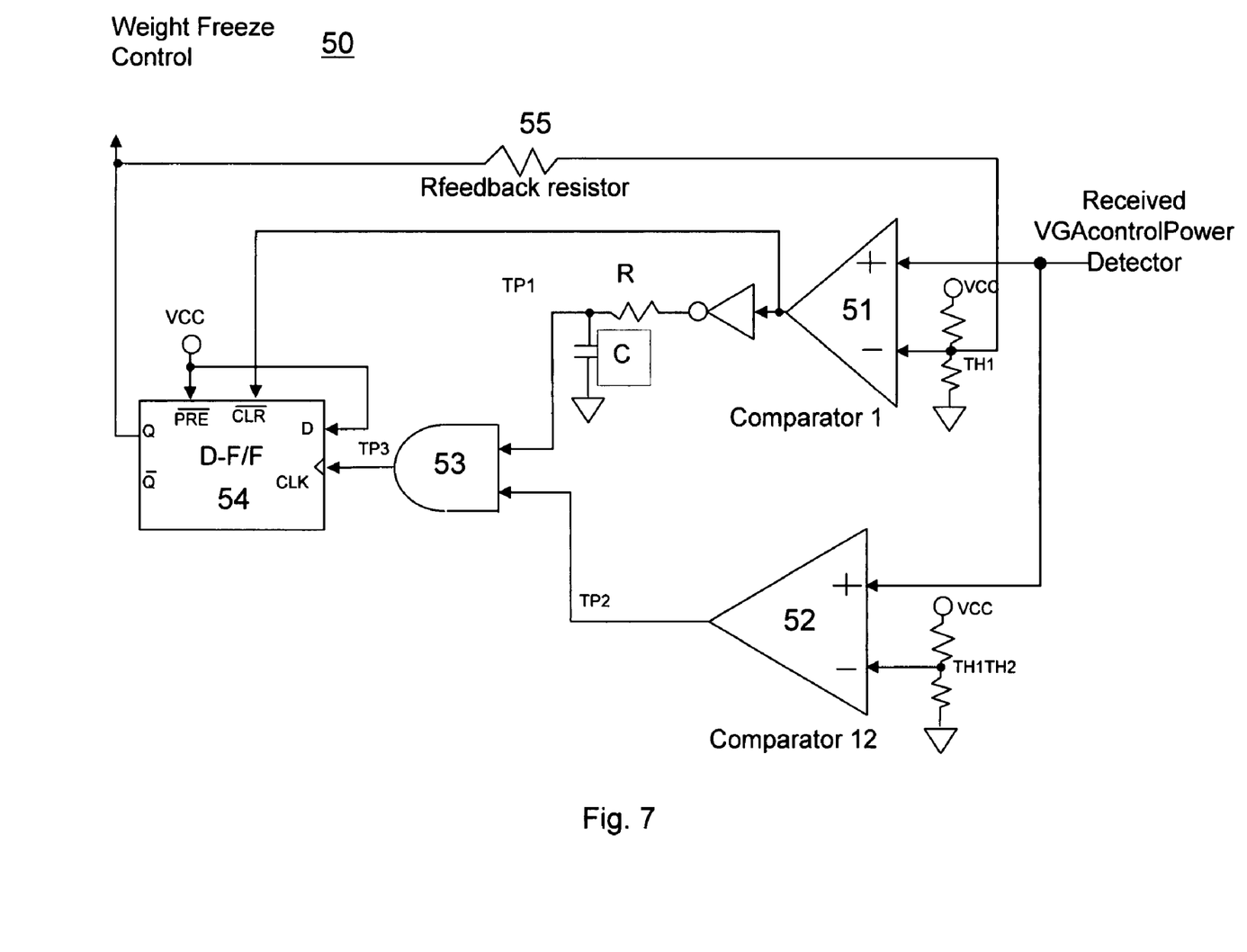
FIG. 7 is a schematic diagram of a weight freeze circuit.

An implementation for providing the weight freeze is shown in FIG. 7. Comparator 51 compares the received signal power to a fixed threshold (TH1). It is triggered at a lower received signal level to create a timing window. The timing window is two microseconds and is determined by the RC time constant at output of the inverter 51.

Comparator 52 triggers at a slightly higher power level, determined by the fixed threshold (TH2). TH2 is slightly higher than TH1. As long as the received signal level exceeds TH2 within two microsecond window, D flip/flop 54 is latched by OR gate 53 and the antenna weight is frozen.

Feedback resistor 55 creates a hysteresis (changes TH1 to TH1') in Comparator 51 to prevent chattering. As soon as the received power level falls below the threshold TH1', D flip/flop 54 is reset and the antenna weight is unfrozen.

SEAM 20 needs to accommodate a very high signal dynamic range. SEAM 20 can provide a step attenuator to accommodate the high signal dynamic range. SEAM 20 detects the received power, and if the received power exceeds a threshold, attenuator 35 is set to a high attenuation. It is possible that access point (AP) 25 receiver operation can be adversely affected when SEAM 20 output power suddenly changes to a different level.

Figure 8:
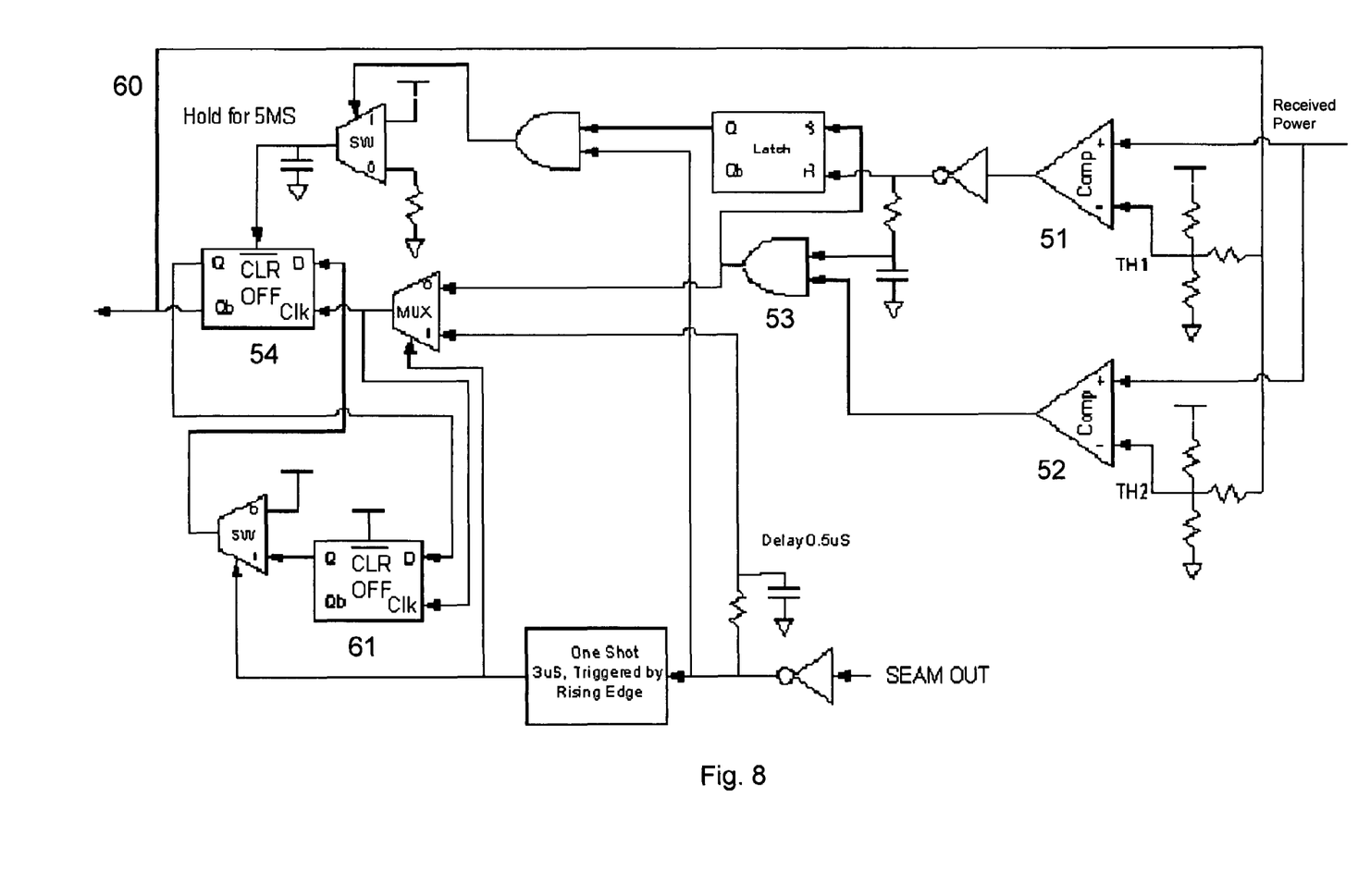
FIG. 8 is a schematic diagram of a transmit detection circuit.

In order to avoid this problem, high-low gain switch 60 can be used as shown in FIG. 8. When the received power exceeds a threshold, SEAM 20 switches to a high attenuation mode. Once it switches, SEAM 20 stays in the high attenuation mode until the next packet arrives. For the second packet, SEAM 20 is already in the high attenuation mode, and no switching occurs, so access point (AP) 25 can receive the packet properly. If the received power still exceeds the threshold, it retriggers the high attenuation mode, and then extends the holding period further to the next packet. This operation continues until the received power falls below the threshold.

It has been found that if a transmit packet is sent in between two received packets, the transmit power level is typically higher than the received level and it triggers the high attenuation mode immediately. To recover back to the state before the transmit packet occurs, the previous state is pushed into a second D-flip/flop 60. At the end of the transmit packet (determined by the falling edge of SEAM_OUT pin 29). The state stored inside the second D flip/flop 60 is pushed back into D flip/flop 54. SEAM 20 then reverts back to the state before the transmit packet occurred. By employing such circuit, SEAM can ensure that its high-low gain switching will not affect the AP receiver operation. This allows SEAM to interface to any AP from different vendors.

Figure 9:
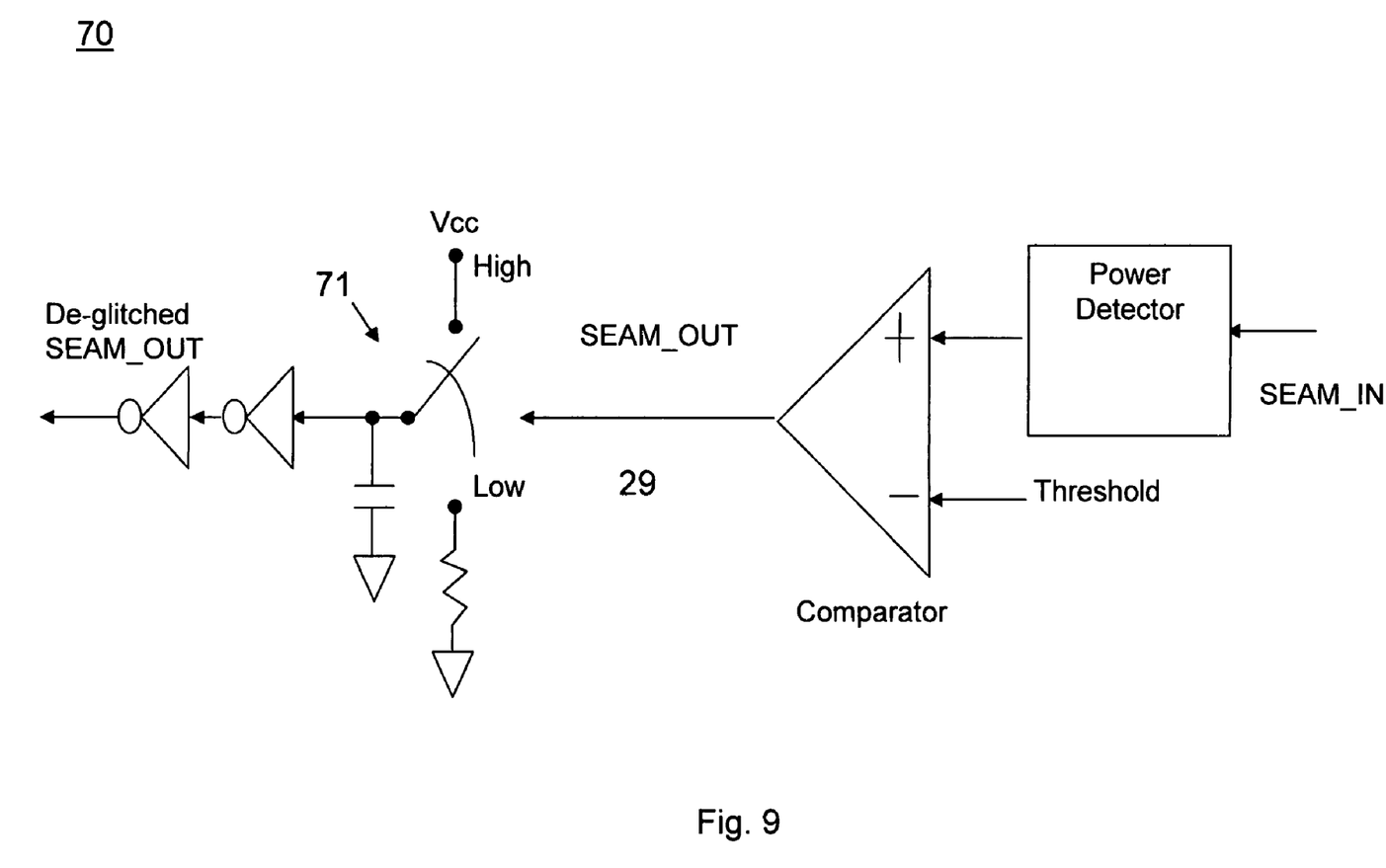
FIG. 9 is a schematic diagram of a de-glitch circuit.

SEAM 20 can employ a power detector to detect the transmit signal from access point (AP) 25 at SEAM IN pin 28 and set SEAM OUT pin 29 high if the signal level exceeds a predetermined threshold. This switches input TR switch 30 and antenna TR switches 22, and turns on PAs 32. When access point (AP) 25 stops transmitting, SEAM OUT pin 29 goes low, and SEAM 20 is back in the receive mode. The signal power level from access point (AP) 25 can fluctuate by a large amount. One example is the 802.11a and 802.11g system employing orthogonal frequency division multiplexed (OFDM) signals which have a large peak to average power ratio. During the transmit duration, the signal power level could fall below the threshold, causing SEAM_OUT pin 29 to go low, and causing the SEAM operation to fail. A deglitch circuit 70 as shown in FIG. 9 can provide transmit detection. SEAM_OUT pin signal 29 controls the switch. When SEAM_OUT pin 29 is high, switch 71 goes to high position. When SEAM_OUT pin 29 is low, switch 71 goes to the low position. Deglitch circuit 70 removes the short duration glitch during transmit packet caused by large power level fluctuation.

System 10 as described above for 802.11 implements time division duplexing (TDD), to use the same antennas for transmission as for reception, with the same weights and obtaining the same performance in both directions with appliqué 12 on just one device. The only requirements are that the channel hasn't changed between reception and transmission, and the relative delays and gains of each of the receiver chains, as well as the transmitter chains, must be similar. Since the transmit power amplifiers have peak power limitations, under this constraint it has been found that improved performance is achieved by using just the phases of the receive weights for transmission (with the gains equal), such as using the equal gain combining weights.

Figure 10:
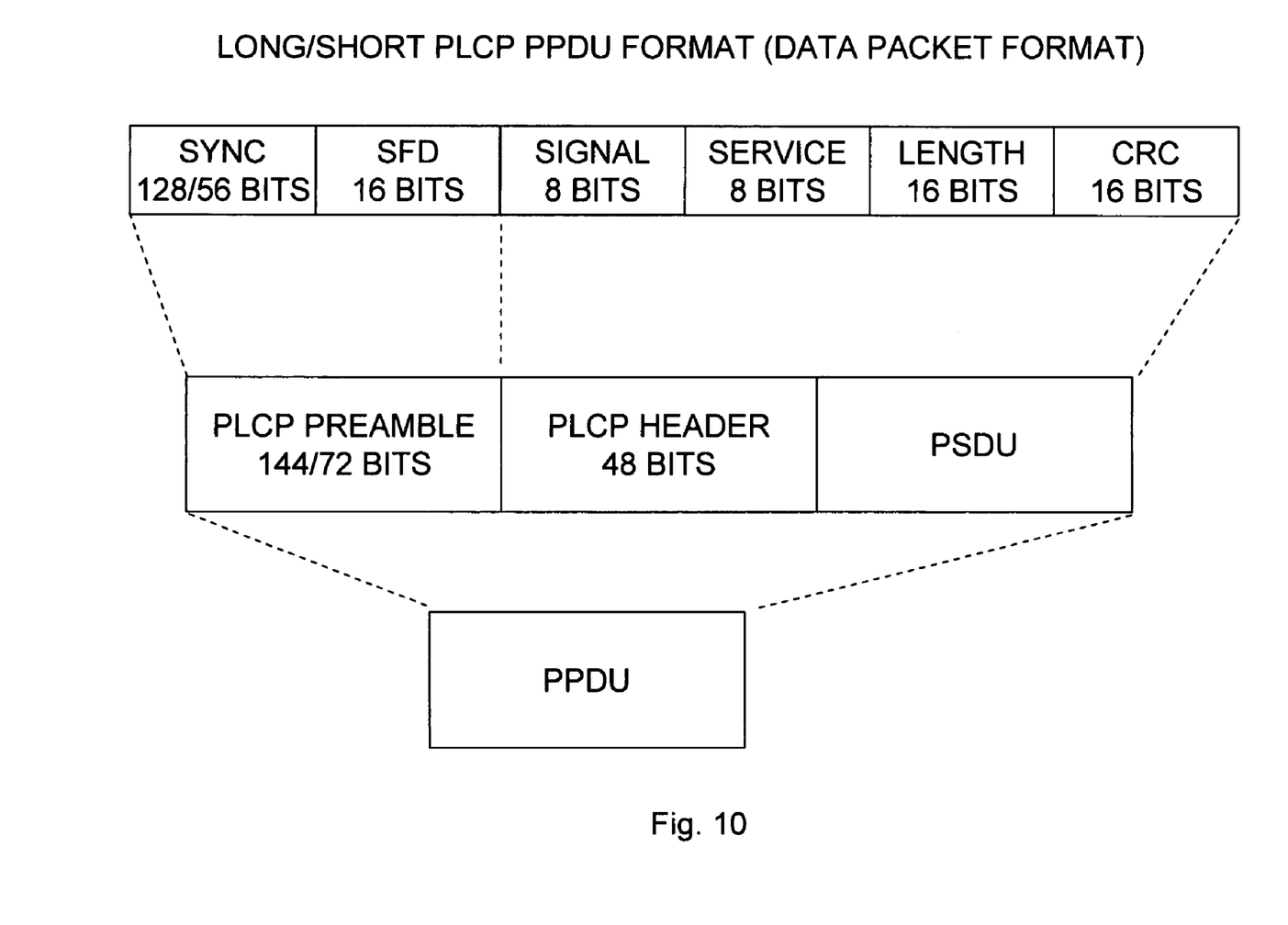
FIG. 10 is a schematic diagram of a data packet format.
Figure 11:
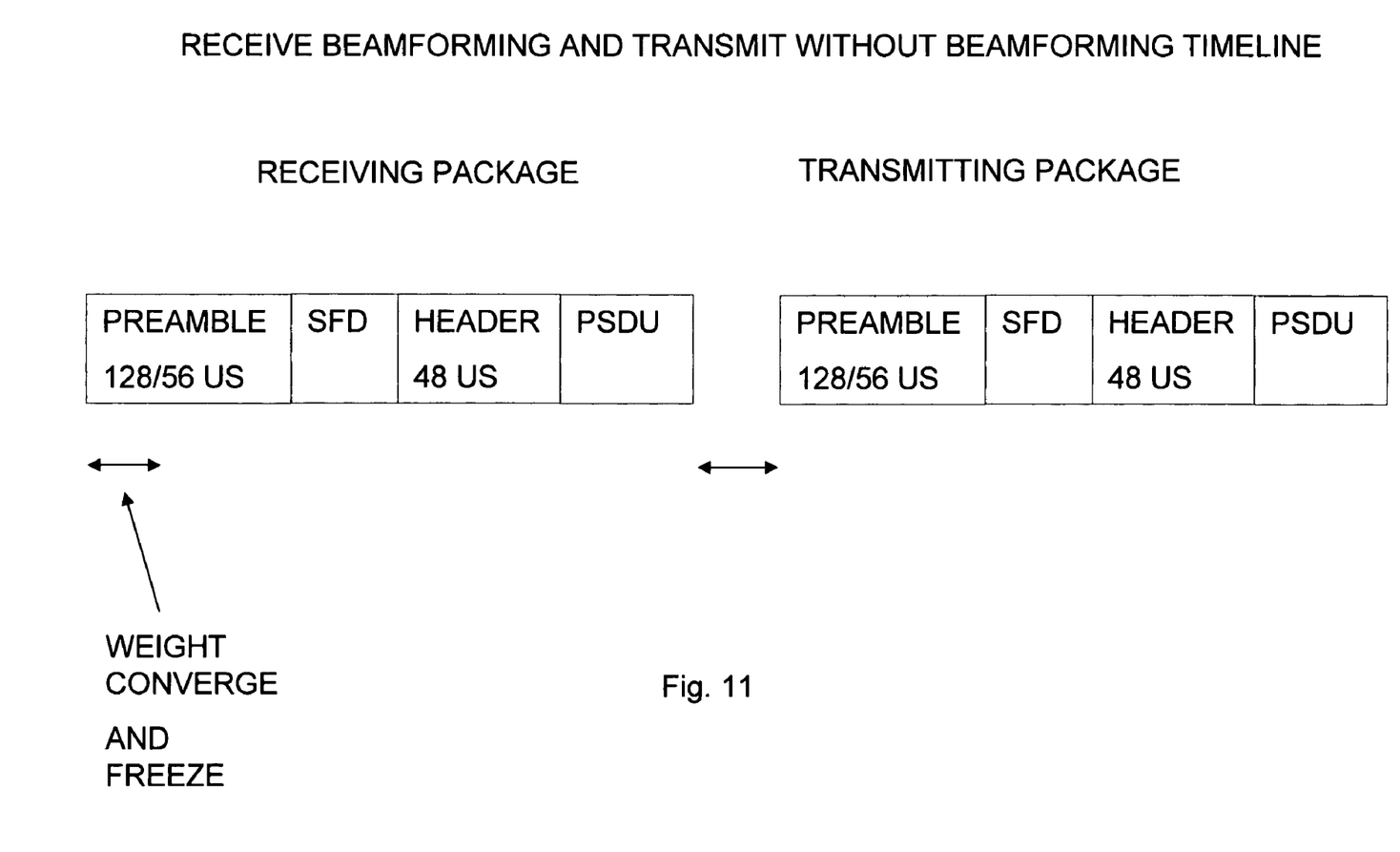
FIG. 11 is a schematic diagram of an operational timeline.

FIG. 10 illustrates a data packet format which can be used in an operational timeline shown in FIG. 11.

With the four element smart antenna at both the client and the access point, computer simulation results show a gain of 18 dB over a single antenna system. The gain is less than 26 dB (i.e., twice the 13 dB gain on one side) because the diversity gain is less on the receive side since transmit beamforming provides most of diversity gain possible. Also, since the weights at the transmitter and the receiver are calculated independently, the gain is less than if they were calculated jointly. With ideal transmit and receive weights the gain would be 22 dB. Accordingly, the present invention is only 4 dB from ideal, and this calculation also includes implementation loss (i.e., weight estimation error).

With delay spread, the 13 dB can be reduced somewhat, even with a temporal equalizer in the receiver. Because the equalizers are not specified in the 802.11b standards, the performance degradation of our spatial processing in delay spread of the present invention will vary with different 802.11b transceivers. It has been found that for a textbook tapped delay line equalizer, the degradation was less than 1 dB (i.e., a 12 dB gain) with delay spreads up to 50 ns rms.

The performance of the smart antenna appliqué for 802.11a/g is shown in Table 1. Computer simulation results are shown for the beamforming gain at a 10% packet error rate (PER) for data rates of 6, 24, and 54 Mbps, short and long packets, and independent Rayleigh fading with different delay spreads. The delay spread model used was an exponential decay with 0 (flat) and 50 ns rms delay spread. Typical indoor environments for 802.11 have delay spreads on the order of 30-50 ns rms. With flat fading, the smart antenna has a gain of 11 to 12 dB, while the gain is reduced to 7 to 10 dB with 50 ns rms delay spread. The gain is further reduced by a few dB with higher delay spreads, typical of outdoor environments.

| Beamforming Gain (dB) @ 10% PER | | | | | | |
|---|---|---|---|---|---|---|
| | | | | 54 Mbps | | |
| 6 Mbps | | 24 Mbps | | Short | Long | |
| Short Packet | Long Packet | Short Packet | Long Packet | Packet | Packet | Summary |
| Flat Rayleigh Fading | | | | | | |
| 11 | 11 | 12 | 12 | 12 | 12 | 11~12 |
| 50 ns Exp Decay Rayleigh Fading | | | | | | |
| 8 | 10 | 7 | 7 | 8 | 9 | 7~10 |

The above cases show the SNR gain with the smart antenna, which can be related to a range increase (e.g., a doubling of range for a 12 dB gain with a fourth law power propagation exponent typical for indoor environments). However, this gain can also translate into a data rate increase in 802.11 systems since higher SNRs allow for higher data rates (up to the peak data rate).

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention. This includes use of the SEAM in other TDD systems, such as 802.16, as well as frequency division duplex systems.

We claim:

1. A smart external antenna module system for retrofitting an existing wireless system, comprising:
   a plurality of antennas, said plurality of antennas receiving input signals;
   means for performing beamforming by generating weights for combining said input signals received from said plurality of antennas;
   means for receiving a signal to be transmitted from said smart antenna system;
   means for operating said smart antenna system in a receive mode until receipt of said signal to be transmitted from said smart antenna system;
   means for operating at least one of said antennas in a transmit mode after receipt of said signal to be transmitted; and
   means for coupling said smart antenna system to a single external port of a single transceiver wherein said means for coupling said smart antenna system to a single external port of a single transceiver comprises a physical connection wherein said physical connection is a single coaxial cable connection, whereby an antenna array can attach to an external port of a transceiver without any modification of the transceiver;
   wherein the transceiver is a wireless LAN access point (AP) wherein said means for performing beamforming is at least one of the following:
   means for using maximal ratio combining wherein each signal is weighted and combined to maximize the output signal-to-noise ratio by computing beamforming weights wherein beamforming weights are the complex conjugate of the channel transfer characteristics whereby the smart external antenna module will maximize the signal-to-noise ratio of any received signal and demodulation of the received signal is not required;
   means for equal gain combining, whereby the signals are co-phased but the gain is the same for each antenna; and
   means for maximizing the output power with normalized weights, and wherein the smart external antenna module system further comprises: a filter coupled to each said plurality of antennas, each of said filters receiving signals from one of said plurality of antennas.

2. The smart external antenna module system of claim 1 wherein said means for operating said at least one antenna in a transmit mode comprises at least one power amplifier having an on/off control for amplifying a signal from said means for performing beamforming for driving said at least one antenna as a transmission antenna and further comprising at least one transmit and receive switch associated with said plurality of antennas, said transmit and receive switch switching said smart antenna system between said means for operating said antennas in a receive mode and said means for operating said antennas in a transmit mode and further comprising: an input transmit and receive switch, said input transmit and receive switch being associated with said means for receiving a signal to be transmitted from said smart antenna and said means for performing beamforming and further comprising: a coupler coupled to said means for receiving a signal to be transmitted from said smart antenna system, upon receipt of said signal to be transmitted, said coupler coupling power of said signal to be transmitted to a power detector for setting said at least one transmit/receive switch associated with said plurality of antennas, and said input transmit/receive switch to a transmit mode and powering on said at least one power amplifier and further comprising means for power detection to sense the power through the coupler connected to the transmit and receive signal path between the smart antenna module and the transceiver to control the direction of the transmit and receive switch and the on/off control of the power amplifier.

3. The smart external antenna module system of claim 2 further comprising: a microprocessor for selecting one or more channels having a highest power level and enabling said means for performing beamforming.

4. The smart external antenna module system of claim 1 further comprising: at least one of a plurality of transmit and receive switches each associated with one of said plurality of antennas and a plurality of said power amplifiers, wherein said power amplifier has an on/off control, each associated with one or more said plurality of transmit and receive switches and said means for performing beamforming; one transmit and receive switch associated with one of said plurality of said antennas and one power amplifier associated with said one transmit and receive switch and said means for performing beamforming; one of said power amplifiers associated with said input transmit and receive switch and said one transmit and receive switch and said one transmit and receive switch associated with one of said plurality of antennas; and, a transmit antenna, one said power amplifier being associated with said transmit antenna and said input transmit and receive switch further comprising means for power detection within the smart external antenna module system to sense the power through a coupler connected to the transmit and receive signal path between the smart antenna module and the transceiver whereby the control of the direction of the transmit and receive switch as well as the on/off control of the transmit power amplifier occurs external to the transceiver of conventional design.

5. The smart external antenna module system of claim 1 for a wireless LAN characterized by the signal arrival time being totally random, further comprising: one of means for freezing said weights at a predetermined time after the beginning of the signal packet until the end of the signal packet and means for freezing said weights at 2 microseconds after the beginning of the signal packet until the end of the signal packet whereby the smart external antenna module system operates adaptively and compatibly with networks where signal arrival time is random and aperiodic.

6. The smart antenna system of claim 1 further comprising: means for switching between high gain and low gain mode in the SEAM receive signal path without disturbing the AP receiver operation.

7. A method for operating smart antenna system comprising the steps methods of:
   receiving input signals at a plurality of antennas;
   performing beamforming by generating weights for combining said input signals received from said plurality of antennas;
   receiving a signal to be transmitted from said smart antenna system;
   operating said smart antenna system in a receive mode until receipt of said signal to be transmitted from said smart antenna system;
   operating one or more of said antennas in a transmit mode after receipt of said signal to be transmitted; and
   coupling said smart antenna system to a transceiver wherein said method of generating weights comprises one of maximal ratio combining comprising performing an analog computation of the complex conjugate of the channel transfer characteristics of each antenna and weighting and combining signals to maximize the output signal-to-noise ratio whereby the smart external antenna module will maximize the signal-to-noise ratio of any received signal and demodulation of the received signal is not required and maximizing the output power with normalized weights; and
   wherein the transceiver is a wireless LAN access point (AP) wherein said means for performing beamforming is at least one of the following:
   means for using maximal ratio combining wherein each signal is weighted and combined to maximize the output signal-to-noise ratio by computing beamforming weights wherein beamforming weights are the complex conjugate of the channel transfer characteristics whereby the smart external antenna module will maximize the signal-to-noise ratio of any received signal and demodulation of the received signal is not required;
   means for equal gain combining, whereby the signals are co-phased but the gain is the same for each antenna; and
   means for maximizing the output power with normalized weights, and wherein the smart external antenna module system further comprises: a filter coupled to each said plurality of antennas, each of said filters receiving signals from one of said plurality of antennas.

8. The method of claim 7 further comprising the step of: selecting one or more channels having a highest power level and enabling said means for performing beamforming.

9. The method of claim 7 further comprising: freezing said weights at a predetermined time after the beginning of a randomly arriving signal packet until the end of the signal packet.

10. The method of claim 9 wherein said weights are frozen 2 microseconds after the beginning of a randomly arriving signal packet until an end of a packet of the input signal.

11. The method of claim 7 further comprising: switching between high gain and low gain mode in the SEAM receive signal path without disturbing the AP receiver operation.

* * * * *